(12) United States Patent
Iyanagi (10) Patent No.: US 8,021,507 B2
(45) Date of Patent: Sep. 20, 2011

(54) TIRE BUILDING DRUM, AND BUILDING SYSTEM, PROCESS SETUP METHOD AND MANUFACTURING METHOD FOR TIRE BUILT BY SAME

(75) Inventor: Satoshi Iyanagi, Kodaira (JP)

(73) Assignee: Bridgestone Corporation, Tokyo (JP)

( * ) Notice: Subject to any disclaimer, the term of this patent is extended or adjusted under 35 U.S.C. 154(b) by 1054 days.

(21) Appl. No.: 10/591,592

(22) PCT Filed: Mar. 2, 2005

(86) PCT No.: PCT/JP2005/003496
§ 371 (c)(1),
(2), (4) Date: Aug. 16, 2007

(87) PCT Pub. No.: WO2005/084928
PCT Pub. Date: Sep. 15, 2005

(65) Prior Publication Data
US 2008/0017298 A1    Jan. 24, 2008

(30) Foreign Application Priority Data

Mar. 5, 2004  (JP) ................................. 2004-062154

(51) Int. Cl.
*B29D 30/24* (2006.01)
(52) U.S. Cl. ......... 156/132; 156/133; 156/415; 156/417
(58) Field of Classification Search .................. 156/131, 156/132, 133, 414–420
See application file for complete search history.

(56) References Cited

U.S. PATENT DOCUMENTS

| | | | | |
|---|---|---|---|---|
| 3,346,434 A * | 10/1967 | Fulton | ............................ | 156/415 |
| 3,616,059 A | 10/1971 | Frazier et al. | | |
| 3,745,085 A * | 7/1973 | Bertrand et al. | .............. | 156/400 |
| 3,776,802 A * | 12/1973 | Mallory et al. | ............... | 156/420 |
| 4,001,070 A * | 1/1977 | Bell | ............................... | 156/398 |
| 4,138,307 A * | 2/1979 | Rost | ............................... | 156/415 |
| 4,292,112 A | 9/1981 | Kumagai | | |
| 4,547,251 A * | 10/1985 | Landsness | ..................... | 156/415 |
| 4,614,562 A | 9/1986 | Jones | | |
| 6,004,250 A * | 12/1999 | Byerley | .......................... | 492/38 |
| 2003/0170336 A1 * | 9/2003 | Caretta et al. | ................. | 425/340 |

FOREIGN PATENT DOCUMENTS

| | | |
|---|---|---|
| EP | 1 547 757 A1 | 6/2005 |
| GB | 549 905 | 12/1942 |
| JP | 48-31273 A | 4/1973 |
| JP | 2002-28986 A | 1/2002 |
| WO | WO 2004/012928 A1 | 2/2004 |

* cited by examiner

*Primary Examiner* — Geoffrey L Knable
(74) *Attorney, Agent, or Firm* — Sughrue Mion, PLLC (57) ABSTRACT

The present invention provides a tire building, and a building system, process setup method and manufacturing method for a tire built by this tire building drum, which can suppress investment cost of the drum core of the tire building drum used in a tire building system for building tires in different sizes, and to shrink an inventory of reserve drum cores. Plural distance pieces having the same thickness and end pieces forming the both end portions in the width direction are aligned in the width direction of the drum core to configure plural rigid segment which constitute the tire building drum. The distance pieces which are detachably configured are so arranged that their thickness direction face in the width direction of the drum core.

9 Claims, 9 Drawing Sheets

TIRE BUILDING DRUM, AND BUILDING SYSTEM, PROCESS SETUP METHOD AND MANUFACTURING METHOD FOR TIRE BUILT BY SAME

TECHNICAL FIELD

The present invention relates to a tire building drum having a circular drum core defining an internal shape of a green tire, the drum core consisting of several rigid segments, and a building system, process setup method and manufacturing method for a tire built by this tire building drum. The present invention is particularly intended to enable a low-cost tire building drum which is capable of manufacturing tires of multiple sizes.

RELATED ART

In the international application PCT/JP03/09949, the present applicant proposed a tire building drum comprising bead lock means for holding a pair of bead cores and a circular drum core expansively supporting a center portion of a carcass band to define an internal shape of a green tire with the outer contour, the drum core consisting of several rigid segments which are radially expandable/contractible and which are circumferentially adjacent to each other to form the above-mentioned outer contour.

Since this tire building drum has the drum core consisting of the several rigid segments, when tire components such as a belt member, a tread member and a side wall member are attached on a center portion of an inflated carcass band, these component can be accurately attached with the drum core being as a base. In additional, the drum core is installed in such a manner that it is located on the central axis of the same building drum in relation to the pair of bead lock means, so that an accuracy of applying these components in relation to the bead cores positioned by the bead lock means can be increased and a tire with higher accuracy can be built. This tire building drum possesses these features.

In such a tire building drum, however, the internal shape of the green tire corresponds one-to-one with the outer contour of the drum core, so that it is necessary to prepare different tire building drums having different types of drum cores for green tires of different sizes and internal shapes. Thus, in the system of manufacturing tires in many different sizes, at least one drum core for every size is needed and where the production volume is high, many drum cores are needed with considering various states of size allocations. In total, vast amount of drum cores must be carried and an investment in this end is expanded. Further, the number of drum cores used at one time is very small in comparison with the total number of the drum cores, so that a space necessary for stocking these drum cores is largely increased. It has been desired to improve these issues.

DISCLOSURE OF THE INVENTION

The present invention has been made in view of these issues, and its object is to suppress investment cost of the drum core of the tire building drum used in a tire building system for building tires in different sizes, and to shrink an inventory of reserve drum cores.

<1> The present invention provides a tire building drum comprising bead lock means for holding a pair of bead cores and a circular drum core expansively supporting a center portion of a carcass band to define an internal shape of a green tire with an outer contour, the drum core consisting of several rigid segments which are radially expandable/contractible and which are circumferentially adjacent to each other to form said outer contour, wherein, as viewed in a cross sectional plane including a central axis of the drum core, said outer contour has a flat contour portion parallel to the central axis in a widthwise central region and each of the rigid segments has several distance pieces forming at least a part of said flat contour portion and end pieces forming portions of the outer contour widthwise outside of the portion formed by the distance pieces, the distance pieces and the end pieces are aligned in the width direction of the drum core, and wherein said distance pieces are disposed such that their thickness direction is directed to the width direction of drum core and are detachably configured, and the thickness of each of the distance pieces is an mutually identical or different integral multiple (including 1) of the unit thickness.

<2> The present invention further provides a tire building drum according to item <1>, wherein said rigid segments comprise a base column supporting the end and distance pieces, a center stopper fixed at the center of the base column in the width direction of the drum core as a base point in the width direction of the drum core, and an end piece fixing means fixing each of the end pieces on the base column, the base column is coupled to a means for radially expanding/contracting the rigid segments, the base column is provided with a guide support portion supporting the end and distance pieces in such a manner that the end and distance pieces can be moved back and forth in the width direction of the drum core, and engagement portion engaging with the guide support portion of the base column are provided on each of the end and distance pieces.

<3> The present invention further provides a tire building drum according to item <1> or <2>, wherein a portion forming the outer contour of the rigid segment is configured by arranging comb plates, which mesh with each other between the adjacent segments, in the width direction, and the distance piece having thickness of N times (N is an integral number) of the unit thickness is so configured that it corresponds to N consecutive comb plates.

<4> The present invention further provides a tire building drum according to any one of items <1> to <3>, wherein, as viewed in the section perpendicular to the width direction of the drum core, the guide support portion of the base column consists of a columnar member, the engagement portion of the distance piece consists of a member engaging with the columnar member in male/female manner in the section perpendicular to the width direction, and a cutout portion for releasing the engagement between the base column and the distance piece is provided on the columnar member at the midpoint in its longitudinal direction.

<5> The present invention further provides a tire building drum according to any one of items <1>-<4>, wherein the drum is used for building a radial tire.

<6> The present invention further provides a tire building drum according to any one of items <1>-<5>, wherein an RFID tag is installed as a means for identifying a size of a current condition.

<7> In another aspect, the present invention provides a tire building system for building a group of tires including tires in different sizes which have mutually different inner widths of green tires, the tire building drum being used for building tires of at least two sizes among said different sizes and according to any one of items <1>-<6>, wherein the number of distance pieces includes zero and one, a total thickness of the distance pieces obtained by summing the thickness of all distance pieces is a given value for every size, and the end pieces are commonly used by these sizes.

<8> In another aspect, the present invention provides a method for setting up a tire manufacturing process, wherein an inner width of a green tire built with the tire building system according to item <7> is selected from plural widths determined by the total thickness of the distance pieces.

<9> In another aspect, the present invention provides a method of manufacturing a tire built with the tire building system according to item <7>, wherein a green tire is built by the steps of locking each of the bead cores with the corresponding bead lock means; thereafter radially expanding the drum core while approaching the bead lock means with each other to inflate the center portion of the carcass band; turning the side portions of the carcass band around the bead cores toward the outside in the radial direction; radially expanding the drum core with keeping the bead cores locked until it reaches the maximum diameter; and assembling tire components including a tread rubber on the expanded drum core.

<10> In another aspect, the present invention provides a method of manufacturing a tire built with the tire building system according to item <7>, wherein the size of the drum core is varied by changing the total thickness of the distance pieces upon changing the size between green tires having different inner widths.

<11> The present invention further provides a method of manufacturing a tire built with the tire building system according to item <10>, wherein, after the size of the drum core is varied and before the drum core is used, a size-identification code in an RFID tag is updated to the code corresponding to the size after the size has varied.

In the tire building drum of item <1>, each of the rigid segments has several distance pieces which forms at least a part of the flat contour portion and which has a thickness of integral multiple (including 1) of the unit thickness, and end pieces forming portions of the outer contour widthwise outside of the portion formed by the distance pieces. The distance pieces and the end pieces are aligned in the width direction of the drum core. The distance pieces are disposed such that their thickness direction is directed to the width direction of the drum core and are detachably configured. Therefore, for plural tire sizes in which only the widths of the drum core used for building tires are different (in a strict sense, only the widths of the flat contour are different), the end pieces and distance pieces are shared, types and numbers of the distance pieces are appropriately selected in response to the width of the flat contour portion and the rigid segments of the drum core is configured by arranging these pieces in the width direction, so that the width of the drum core can be varied according to the size with the unit thickness being as its unit and thus it is possible to handle these sizes with greatly reduced number of cores as compared to the prior art building system which must have the same number of drum cores as the number of sizes. It can also largely reduce the inventory therefor. Although only the distance pieces having the unit thickness may be aligned to achieve a given total thickness of the distance thickness obtained by summing the thickness of all distance pieces constituting one tire building drum, less number of distance pieces can achieve the same total thickness ion the condition that the distance pieces having thickness of integral multiple of the unit thickness are included. As a result, an operation of varying the size can be more efficiently conducted.

In the tire building drum of item <2>, the rigid segments comprise a pair of end pieces, plural distance pieces, a base column, a center stopper and an end piece fixing means, and a guide support portion for moving the end pieces and the distance pieces back and forth in the width direction of the drum core is provided on the base column. When the width of the drum core is varied, the pair of the end pieces are moved outwardly in the width direction and thereafter a given number of distance pieces are inserted or removed to increase or decrease the number of distance pieces in the drum core. Then, the end pieces are moved inwardly and the same number of distance pieces are arranged at both sides of the center stopper in the width direction, and the end pieces are pushed against the center stopper from the both sides in the width direction via the distance pieces to fix the end pieces on the base column at that position. In this way, the size of the drum core can be varied precisely in shorter time.

In the tire building drum of item <3>, a portion forming the outer contour of the rigid segment is configured by arranging comb plates, which mesh with each other between the adjacent segments, in the width direction, so that, when the comb plates have sufficient height, the segments can be prevented from misaligning with each other in the width direction while forming a circumferentially continuous outer circumference face. Therefore, upon expanding to support the green tire, the inner face can be supported continuously and precisely over the entire circumference. This enables a higher accuracy in assembling the tire components such as belt members and tread members. In addition, the distance pieces which have thickness of N times (N is an integral number) of the unit thickness is so configured that it corresponds to N consecutive comb plates, so that commonness including a shape as well as a thickness, i.e. compatibility can be secured.

In the tire building drum of item <4>, the cutout portion for releasing the engagement between the base column and the distance piece is provided on the columnar member which is the guide support portion of the base column at the midpoint in its longitudinal direction, so that the base column and the distance piece can be engaged and released without completely removing the end piece from the base column by pulling back the distance piece until the cutout portion can be seen. This may facilitate the installation and disinstallation of the distance piece to reduce the time necessary for these operations.

In the tire building drum of item <5>, a green tire having an inner shape generally identical to that of the product tire is used for building a radial tire, so that when radial tires in a given number of sizes, which tires need remarkably many drum cores as compared with bias tires, are manufactured, the tire building drum can contribute to reducing the number of carried drum cores and the space for the inventory of the spare drum cores.

In the tire building drum of item <6>, an RFID tag in which data are easily rewritable is installed on the tire building drum as a size identification means, so that when data of a current size is written to the RFID tag, it can be preferably used as a means for identifying a current size of the tire building drum according to any one of items <1> to <5> whose size is frequently varied with increasing or decreasing the number of distance pieces. This can solve the problems that the conventional identification means such as symbols engraved on the tire building drum and barcode labels attached on the tire building drum cannot flexibly correspond to the size variation.

In the tire building system of item <7>, the tire building drum is used for building green tires of at least two sizes among the different sizes which have mutually different inner widths and according to any one of items <1>-<6>, wherein the number of distance pieces includes zero and one, a total thickness of the distance pieces obtained by summing the thickness of all distance pieces is a given value for every size, and the end pieces are commonly used by these sizes, so that types and number of the distance pieces are appropriately selected according to the width of the flat contour portion which is decided by the size and these pieces are aligned in the width direction, so that the width of the drum core can be varied according to the size with the unit thickness being at its unit. This enable the greatly reduced number of drum cores to handle these sizes as compared to the prior art building system which must have the same number of drum cores as the number of sizes, and can also largely reduce the inventory.

In the method of item <8>, the inner width of the green tire is selected from plural widths determined by the total thickness of the distance pieces to set up the tire manufacturing system, so that a drum core capable of accommodating all the sizes intended for the building can be configured as a pair of end pieces and a given number of distance pieces. This can further enhance the reduction in the number of carried core drums and the extent of the compression of the inventory.

In the method of item <9>, the drum core is radially expanded with keeping the bead cores locked until it reaches the maximum diameter, and tire components including tire tread are assembled on the expanded drum core, so that the accuracy of the position of assembling the tire components with respect to the bead cores can be improved to give a higher-accuracy tire.

In the method of item <10>, the size of the drum core is varied by changing the total thickness of the distance pieces, so that the number of carried drum cores can be reduced and the inventory can be compressed, as mentioned in the above.

In the method of item <11>, after the size of drum core is varied, the size-identification code in the RFID tag is updated to the code corresponding to the size after the size has varied, so that the current size of the tire building drum can be conform to the size corresponding to the size identification codes stored in the RFID attached thereto.

BRIEF DESCRIPTION OF THE DRAWINGS

FIGS. 1(*a*) and 1(*b*) are a sectional view of a tire building drum of one embodiment according to the present invention;

FIGS. 2(*a*) and 2(*b*) shows an embodiment of rigid segments in a state where a drum core is radially expanded/contracted;

FIGS. 4(*a*) and (*b*) are a side view and sectional view, respectively, of the rigid segments;

FIGS. 6(*a*), 6(*b*) and 6(*c*) are a sectional view of a tire under a manufacturing process by way of example of a tire manufacturing step;

FIGS. 7(*a*), 7(*b*) and 7(*c*) are a sectional view of a tire under a manufacturing process showing in a step following the step as shown in FIG. 6;

FIGS. 8(*a*), 8(*b*) and 8(*c*) are a sectional view of a tire under a manufacturing process showing in a step following the step as shown in FIG. 7.

BEST MODE FOR CARRYING OUT THE INVENTION

Figure 1:
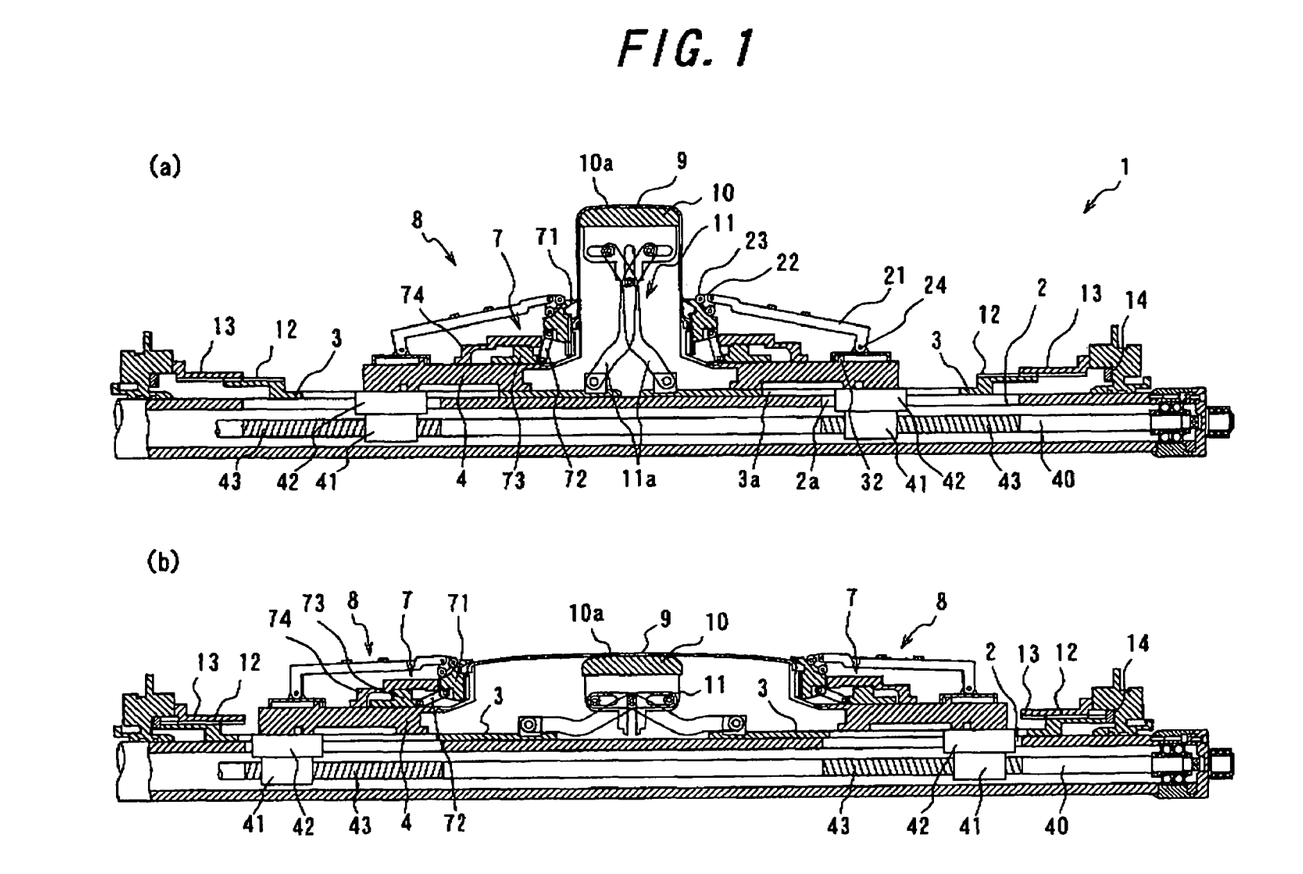

Embodiments of the present invention are described with reference to the figures. FIG. 1 is a sectional view schematically showing a generally half portion including a central axis of a tire building drum according to one embodiment of the present invention. The tire building drum 1 is provided with a pair of sleeves 3 getting close to and away from each other in the axial direction on a central shaft 2, and sliders 4 getting close to and away from each other on the central axis independently from the sleeves 3 are provided on the outer periphery of the sleeves 3.

Further, bead lock means 7 for holding bead cores are provided on the outer periphery of the sliders 4 and fixed on the sliders 4. The bead lock means 7 has bead lock segments 71 which are radially expanded/contracted in a circle and which are circumferentially adjacent with each other, links 72 which are hinged to the lock segments 71 at one end, bead lock pistons 73 which are connected to the other end of the links 72 and displaceable in the axis direction, and bead lock cylinders 74 which is fixed on the outer periphery of the sleeve 3 and which causes displacements of the bead lock pistons.

A drum core 10 having an outer contour 10*a* of a hog-backed sectional shape is provided at the axially middle of the both bead lock means 7 and radially expanded/contracted to define the inner shape of the green tire. The drum core 10 consists of several rigid segments 50 mutually engaged with plural comb plates to form a circle. One end of a link structure 11 consisting of a pair of links 11*a* hinged to each other at the middle portion is connected to each of the rigid segments 50. The other end of the link structure 11 is attached to the sleeves 3. The sleeve 3 is provided with the below-mentioned means for driving the sleeves back and forth. The link structure 11 serves as a means for radially expanding/contracting the rigid segments 50.

The building drum 1 also has turning means 8 which are arranged on each of the sliders 4 and turn the side portions of the carcass band around the bead cores toward radially outside in the radial direction. The building drum 1 further has a toroidally expansible/contractible center bladder 9 made of a reinforcing rubber membrane, which bladder extends radially outward from the drum core 10 and seals the space surrounding the drum core 10. The axially end portions of the center bladder 9 are fixed on the axially inner ends of the sliders 4 at the position adjacent to the portions axially inside of the bead lock means 7. With such a configuration, the axially end portions of the center bladder 9 are integrated with the bead lock means 7 located in the axially same side to get close to and away from each other.

The turning means 8 is configured by pivotably attaching turning rollers 22, 23 to the tip ends of turning arms 21 swingable around base end portions 24 attached to the sliders 4. It is noted that FIG. 1(*a*) shows a state where the pair of bead lock portions 7 and drum core 10 are radially expanded and these bead lock means 7 get close to each other, and that FIG. 1(*b*) shows a state where the bead lock means 7 and the drum core 10 are radially contracted and these bead lock get away from each other.

In order to get the pair of bead lock means 7 close to each other, each of the slider 4 are proximally displaced. In order to radially expand the bead lock segments 71, the bead lock piston 73 is axially inwardly displaced to radially expand the end portion of the link 72 at the side of the bead lock segment 71.

The means for driving the bead lock back and forth which get the pair of bead lock means 7 close to each other consist of female screw members 41 coupled to radially inside of the sliders 4 via coupling members 42, a screw shaft 40 which is provided on the on hollow portions in the central shaft 2 and which has left and right male screw portion 43, and a means (not shown) for rotating the screw shaft 40. The lead directions of the male screw portions 43 of the screw shaft 3 are mutually in the opposite directions. With such a configuration, it is possible to symmetrically get the female members 41 close to and away from each other by rotating the screw shaft 40 with the means for rotating the screw shaft, thereby accurately getting the pair of bead lock means 7 mounted on the sliders 4 close to and away from each other. The central shaft and sleeve 3 are provided with through hole 2a, 3a extending through the coupling members 42

In order to radially expand the drum core, the sleeve is get close to each other by the driving means of the sleeves 3 and the end portions of the pair of links 11a coupled to the sleeve 3. In this way, the end potions in the side of the rigid segment 10a of the link structure 11 are radially expanded with the expansion of the rigid core and held in position.

Owing to this, the shaped carcass band can be supported from inner periphery side of the center bladder 9 with its rigidity from the expanded state with the maximum radius to the contracted state. Thus, the belt and tread members can be accurately assembled on the outer periphery side of the carcass band.

Moreover, in the course of expansion, the side face of the shaped carcass band can be supported from the axially inside by the rigidity of the side face of the rigid segments 50, so that when the side portion of the carcass band is turned over, it can be securely pressed against the tire component members including the bead cores to enhance the bead fitting.

As shown in FIG. 1, the means for driving the sleeve 3 can be configured from screw portions 12 which are formed at the end portions of the sleeve 3 and have mutually opposite extending directions of the screw thread between the left and right sleeves 3, screw blocks 13 threadably mate with them and not-shown rotating means for relatively rotating the sleeves 3 and the screw blocks 13. In this case, stoppers 14 are provided at the end portions of the central shaft 2 to limit the axial displacement of the screw portions 12 of the sleeves 3.

In FIG. 1, the screw portions 12 and the screw blocks 13 are configured in male threads and female thread, respectively, but the opposite configuration may be acceptable.

Owing to this, with the use of more simple and versatile screw structure, the rigid segments 50 can be radially expanded and contracted with the expansion of the end portions of the links 11a in the side of the rigid segments 50 by accurately getting the pair of sleeves 3 close to or away from each other on the central shaft 2 of the tire building drum to get the end portions of the links 11a coupled to the sleeves 3. As a result, depending on the size of the tire to be built, the rigid segments 50 can be accurately positioned and supported at any position in the radial direction of the building drum and thus the belt members, tread members and the like can be assembled with a higher accuracy.

Figure 2:
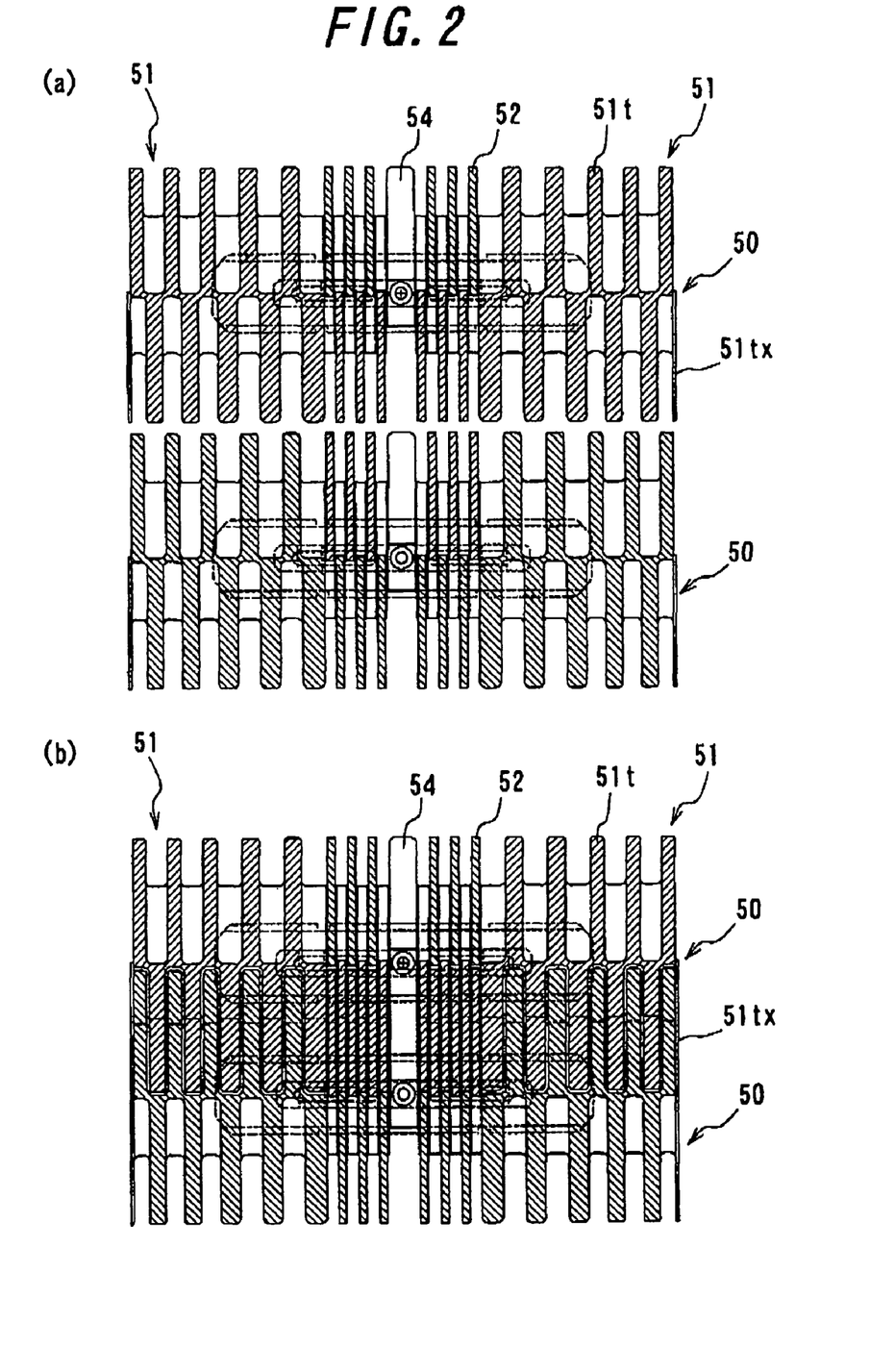
Figure 3:
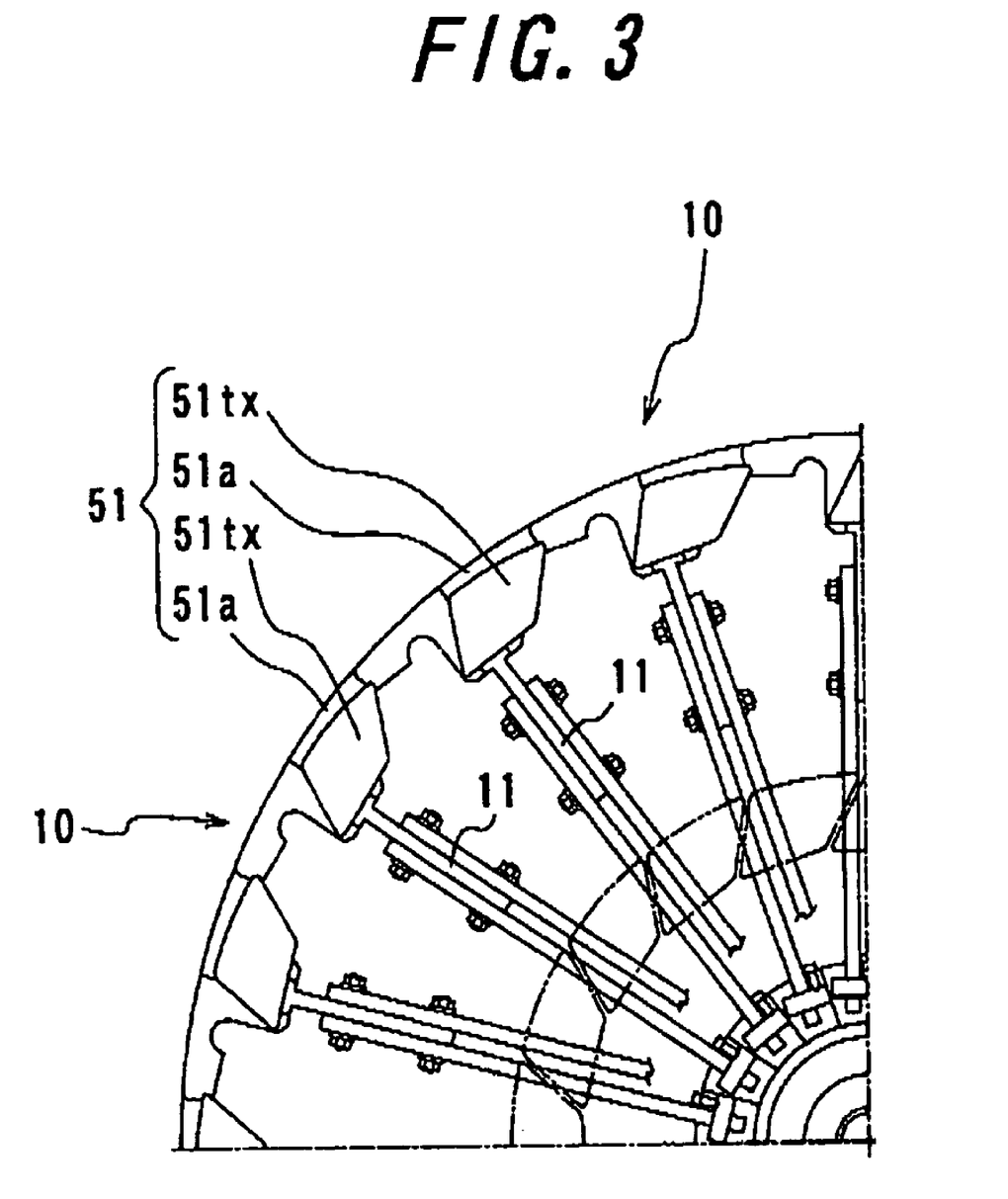
FIG. 3 is a side view of the drum core as viewed in the axis direction.
Figure 4:
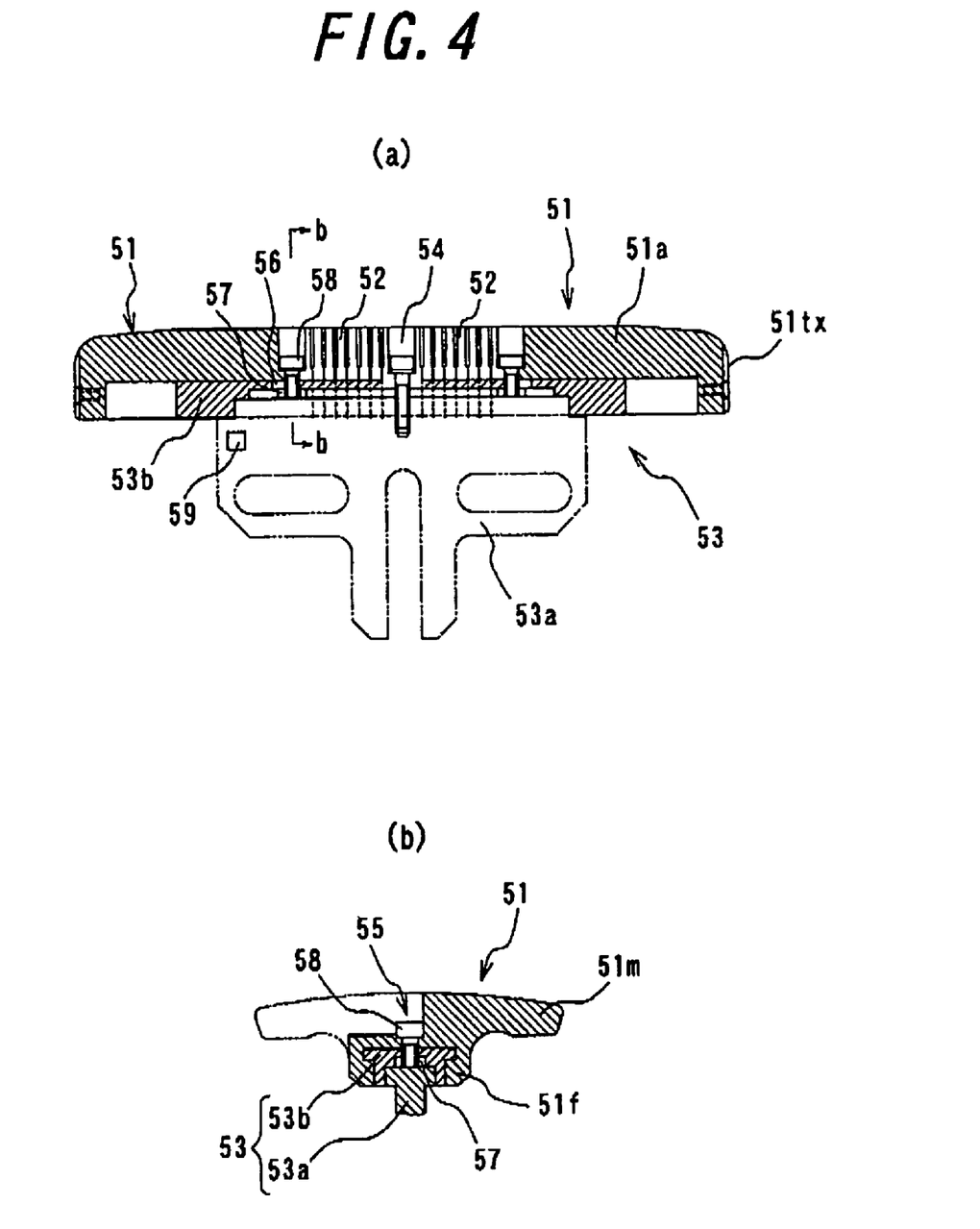
Figure 5:
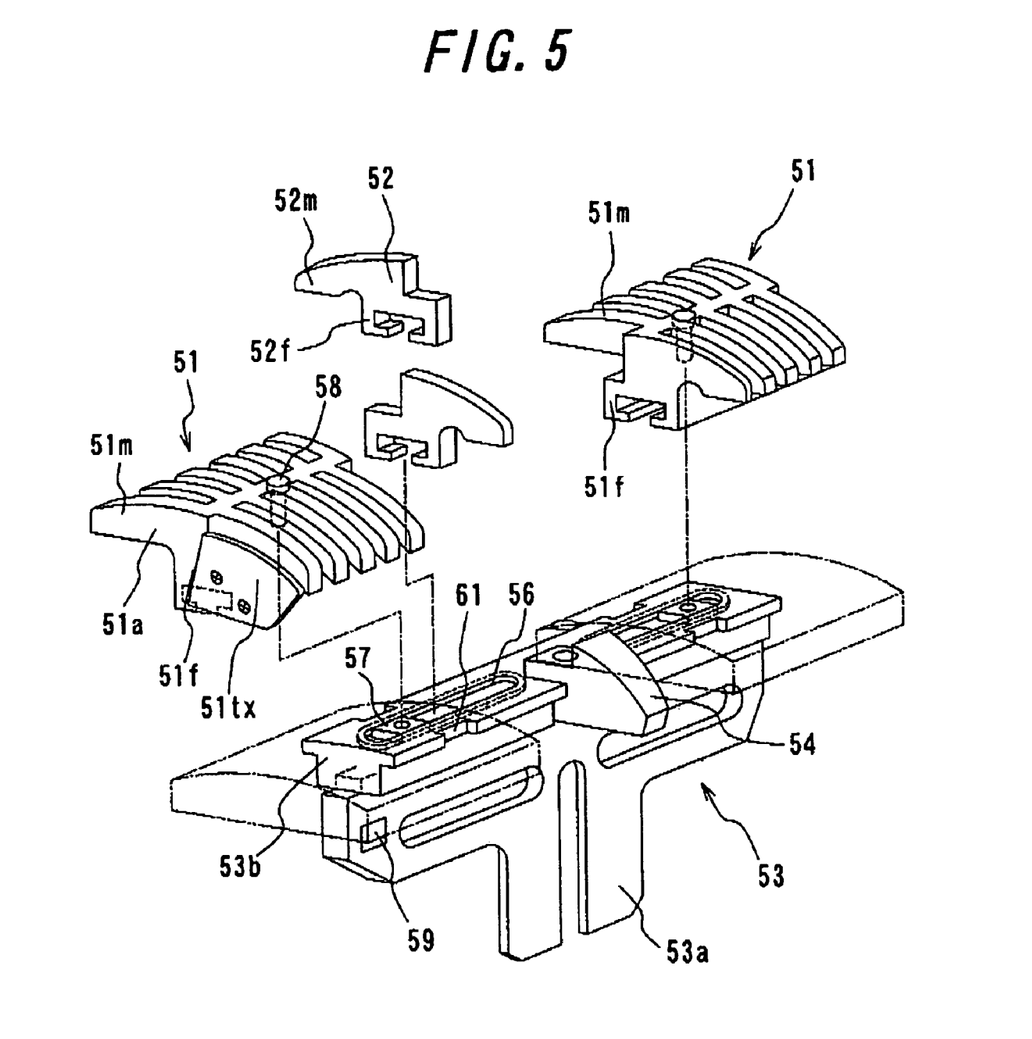
FIG. 5 schematically shows procedures of assembling/disassembling the rigid segments.

Next, the rigid segments 50 are described in detail. FIG. 2 shows an embodiment of rigid segments 50 in a state where the drum core 10 is radially expanded/contracted. FIG. 2(a) shows two adjacent segments 50 as viewed from the radially outside in a state where the drum core 10 is expanded to the maximum radius. FIG. 2(b) shows these segments 50 as viewed from the radially outside in a state where the drum core 10 is contracted. FIG. 3 is a side view of them as viewed in the axis direction. In FIG. 2, the portions shown by hatching correspond to the outer contour 10a of the drum core. In FIG. 3, the solid lines indicate the expanded state and the dotted lines indicate the contracted state. FIG. 4(a) is a side view of the rigid segments 50 and FIG. 4(b) is a sectional view taken along the line b-b in FIG. 4(a). FIG. 5 schematically shows procedures of assembling the rigid segments.

The rigid segments 50 have a configuration in which the portions forming the outer contour 10a of the drum core 10 is constructed by arranging plural comb plates in the width direction of the drum core, and the comb plates of the adjacent rigid segments 50 are mutually engaged. The rigid segments 50 have end pieces 51 arranged at the both ends in the width direction of the drum core, distance pieces 52 aligned inside of the end pieces in the width direction of the drum core, base columns 53 supporting the end pieces 51 and distance pieces 52 in such a manner that it can move back and forth in the width direction of the drum core, center stoppers 54 served as positioning reference of the end pieces 51 and distance pieces 52 in the width direction of the drum core, and end piece fixing means 55 for fixing the end pieces on the base columns 53. As shown in FIG. 5, the end pieces 51 are thicker than the distance pieces 52 in the width direction of the drum core 10.

The end pieces 51 consist of outer contour forming portions 51m forming the outer contour 10 of the drum core, and engagement portions 51f engaged with the base columns in such a manner that they can move back and forth in the width direction of the drum core. The outer contour portions 51m are configured by forming one or more comb plates 51t at the both circumferential ends of the drum core, and the comb plates are aligned in the width direction of the drum core with an arrangement in which they are mutually separated by a half pitch.

Although the end portions of the end pieces 51 in the width direction of the drum core form the side portion of the outer contour 10a of the drum core 10, the comb plates 51 is so arranged that the circumferentially adjacent rigid segments 50 may not interfere with each other even when the drum core 10 is contracted. In a state where the rigid segments 50 are expanded, the side portion of the outer contour 10a has a configuration in which portions with and without the comb plate 51tx located at the outermost portion in the width direction of the drum core are alternately arranged in the circumferential direction. In order to make the gap between these portions as small as possible, the comb plate 51tx at the outermost portion in the width direction is so constructed as to have the smallest thickness. The end pieces 51 may have a configuration in which the comb plate 51tx is integrated with the end piece body portion 51a. Alternatively, the end pieces 51 may be a separated side contour member 51b and assembled to the end piece body portion 51a.

The distance pieces also consist of outer contour forming portion 52m forming the outer contour 10a of the drum core, and engagement portion 52f related to the backwardly and forwardly displaceable support of the base column. The outer contour forming portion 52m is so configured that they can be a comb plate with which the circumferentially adjacent rigid segments 50 are mutually engaged. Any distance pieces 52 have the unit thickness t and a symmetrical shape in the thickness direction, and are arranged in the width direction of the drum core in a zigzag manner.

The base columns 53 consist of coupling members 53a which are arranged in the width direction of the drum core and which are coupled to the link 11 radially expanding/contracting the rigid segments 5, and columnar members 53b which are attached to the outside of the coupling member 53a in the width direction of the drum core and which have T-shaped cross section and which extend in the width direction of the drum core. The columnar members 53b are engaged with the engagement portions 51f, 52f of the end pieces 51 and distance pieces 52 to serve as guide support portions guiding and supporting the backward and forward displacements of them in the width direction of the drum core. The engagement portions 51f, 52f of the end pieces 51 and distance pieces 52 are configured in such a shape that they surround the columnar member 53b except a part in the section perpendicular to the longitudinal direction of the columnar members 53b.

Preferably, a cutout portion 61 for releasing the engagement with the distance piece 52 is provided on the columnar member 53b at the middle point in the longitudinal direction of the columnar member 53b. In this case, the engagement portion 52f of the distance piece 52 can be gotten through the cutout portion 61 in the direction perpendicular to the columnar member 53b, so that the distance piece may be displaced back and forth with respect to the base column 53 without temporally removing the end piece 51 from the base column 53.

The section of the columnar member 53b may have various shapes as far as it can prevent the end pieces 51 and distance pieces 52 from rotating. For the engagement between the base column 53 and the end piece 51 or the distance piece 52, the base column 52 may be a male thread in stead of the above-mentioned embodiment which has a male threaded base column.

The base column 53 is so configured that the coupling member 53a and columnar member 53b are coupled or integrated and a T-shaped groove 56 extending in the width direction of the drum core is formed between these members with both longitudinal ends of the groove being closed. In the T-shaped groove 56, a screw nut 57 is arranged to be restrained from rotating by groove walls. The end piece 51 can be fixed on the base column 53 at a desired position in the width direction of the drum core by fastening the nut 57 onto the bolt 58 with the end piece 51 intervening therebetween. An end piece fixing means 55 consists of the T-shaped groove 56, nut 57 and bolt 58.

For the identification of the size of the tire building drum 1, an RFID tag 59 in which the current size of the tire building drum is written is attached on the tire building drum 1. In the embodiment shown in FIGS. 4 and 5, the RFID tag is attached on the base column 53, but the RFID tag 59 may be attached on any other places at which size data can be easily written to and read from the RFID tag 59 and which is on the component of the tire building drum commonly used in the different sizes. A flange portion which is a base portion for mounting the tire building drum 1 is a preferred example of another possible place for attaching, and the end piece 51 and the center stopper 54 can be recited by way of example.

The center stoppers 54 of each of the rigid segments 50 aligned in the circumferential direction, which are also comb plates located in the middle in the width direction of the drum core, form a part of the outer contour 10a of the drum core 10, and are arranged on each of the rigid segments 50 to be biased toward one side in the circumferential direction of the drum core in order to prevent the center stoppers 54 of the circumferentially adjacent rigid segments 50 from interfering with each other in a state where the drum core 10 is contracted.

The tire building drum 1 having the drum core 10 configured in the above-mentioned manner can be subjected to a building of green tires having different inner widths with simply changing the number of the distance pieces 52 to vary the width of the drum core 10. Thus, as compared with the conventional production which should have different drum cores 10 for the green tires having different inner widths, the present invention can considerably reduce the number of the carried drum cores and thus can save a space for storing the spare drum cores. In the above-mentioned embodiments, the distance pieces 52 have the same thickness, i.e. the unit thickness t. Alternatively, instead of using N pieces of consecutive distance pieces 52, a distance piece having a thickness N times as much as the unit thickness t, which may be obtained by integrating N pieces of the consecutive distance pieces, may be used. With combinations of distance pieces including those having thickness of multiple times of the unit thickness, a single distance piece may replace N pieces of the distance pieces having the unit thickness t in the operation of inserting into or removing from the base column 53, thereby improving the operational efficiency of the size change. For example, when distance pieces having a thickness twice as much as the unit thickness t are used to make the total thickness of the distance pieces on one side in the width direction of the drum core five times as much as the unit thickness t, this can be achieved by using three distance pieces, one of which having the unit thickness t and two of which having the thickness twice as much as the unit thickness, so that the total number of used distance pieces can be reduced as compared with the case where five distance pieces having the unit thickness t are used.

The method of increasing/decreasing the number of distance pieces 52 for the size change is discussed below. First, the bolt 58 constituting the end piece fixing means 55 is removed and the end piece 52 is displaced toward the outside in the width direction of the drum core until the cutout portion 61 appears. Then, the necessary number of the distance pieces are inserted into or removed from the base column 53 to increase or decrease the distance pieces engaged with the base column 53. The end piece 52 is pushed against the center stopper 54 via the distance piece 51 to align them in the width direction of the drum core without any space therebetween, and thereafter the end piece 52 is fixed on the base column 53 at this position by the end piece fixing means 55. This operation is conducted on every rigid segment 50 constituting the drum core 10, so that the size of the drum core 10 may be changed. Finally, the size data after the size change is written in the RFID tag 59 attached on the base column 53.

Figure 6:
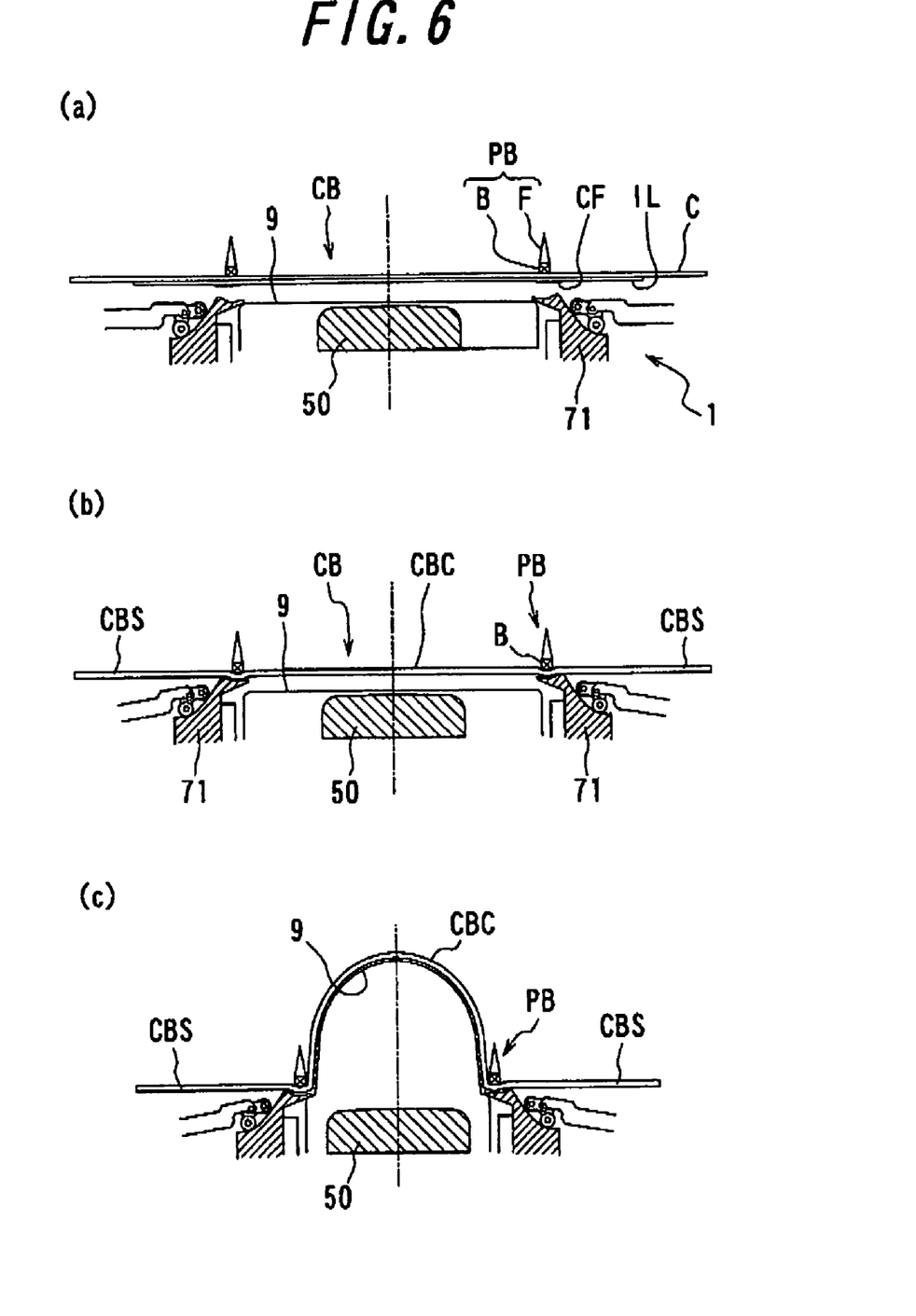
Figure 7:
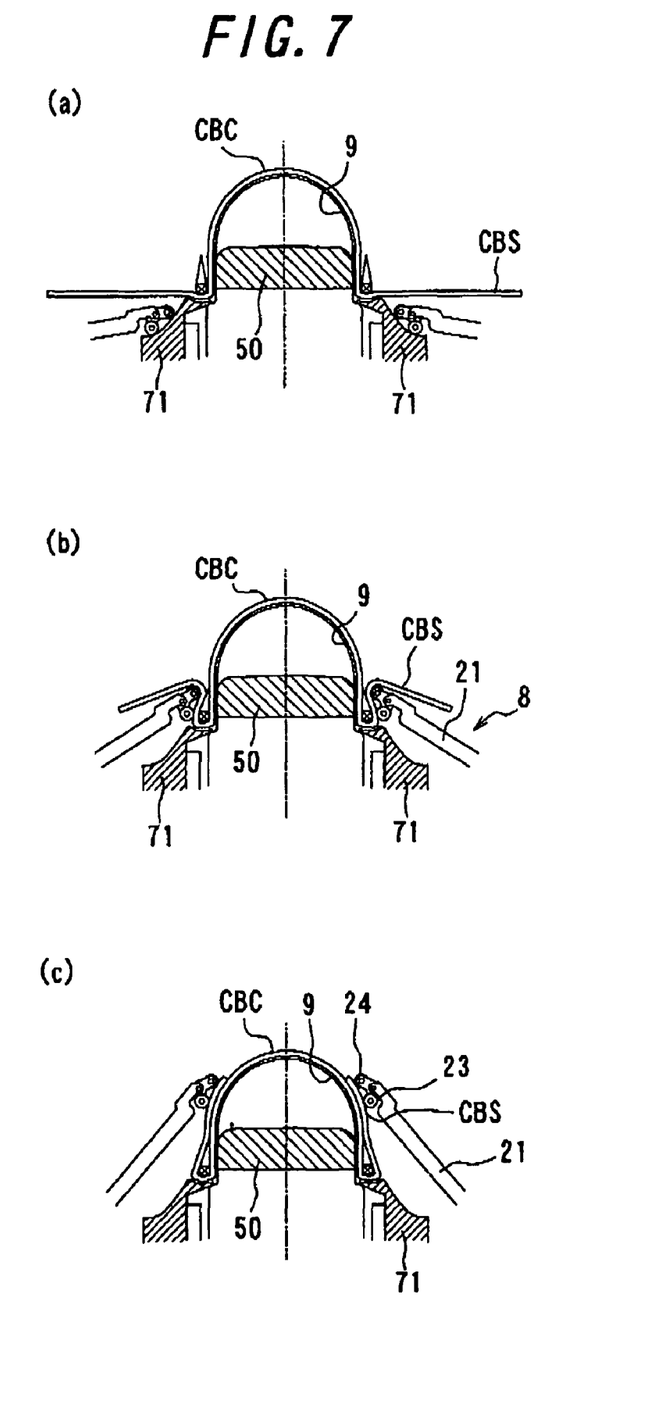
Figure 8:
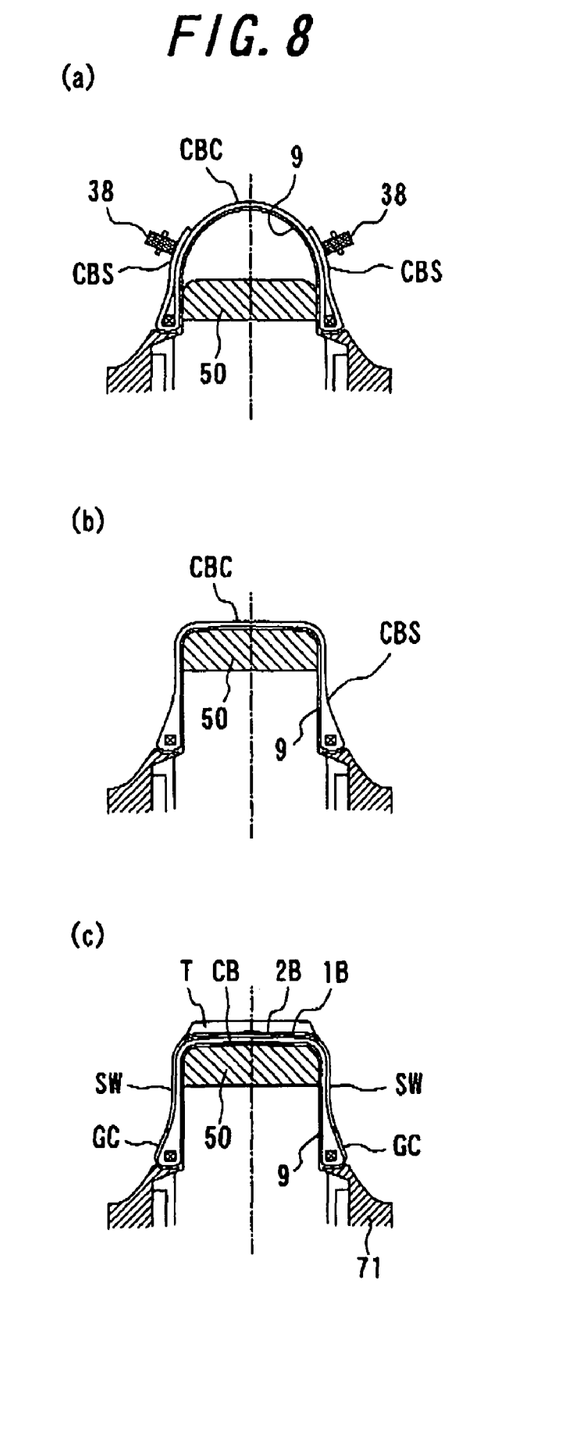

FIGS. 6 to 8 are sectional views of tires under a building process showing tire building steps using the above-mentioned tire building drum 1 by way of example. When the tire is built with the tire building drum 1, as shown in FIG. 6(a), a preset bead PB on which a bead core B and a bead filler member F are preliminarily preset and a generally cylindrical carcass band CB in which an inner liner member IL and a canvas chafer CF are mounted on a carcass member C are arranged on the outer circumferential side of the tire building drum 1. Then, as shown in FIG. 6(b), a bead lock segment 71 of the bead lock means 7 is radially expanded to lock the bead core B under an action of a link 72 by forwardly displacing the bead lock piston 73 shown in FIG. 1. After that, as shown in FIG. 6(c), the left and right bead cores B are displaced toward each other under an action of the slider 4 shown in FIG. 1 while being locked by the corresponding bead lock segments 71, and the space sealed by the center bladder 9 is simultaneously pressurized to toroidally inflate a middle portion CBC of the carcass band CB extending between the bead cores B.

Subsequently, as shown in FIG. 7(a), the rigid segments 50 are radially expanded until their side faces reach the height corresponding to the position of the bead core B in the radial direction, and the segments are fixed at the position. Then, under an action of the slider 4, the bead lock segments 71 on both sides are displaced toward each other to make the inner surface of the center bladder 9 adjacent to the side of the rigid segments 50 as close as possible and substantially eliminate the gap therebetween. Afterward, as shown in FIG. 7(b), the turning means 8 are actuated and the base portion 24 of the turning arm 21 is displaced toward the center in the axial direction to begin to turn the carcass band side portion CBS.

After that, as shown in FIG. 7(c), the turning rollers 23, 24 are displaced toward radially outside along the outer contour line of the carcass band center portion CBC. At this point, the turning of the carcass band side portion CBS has completed.

When the turning rollers 23, 24 are used to turn the carcass band side portion CBS, the rigid segments 50 are preferably displaced in synchronization with the expansion of the rollers 23, 24 such that the rollers 23, 24 always face to the sides of the rigid segments 50. This ensures a press attachment of the carcass band center portion CBC of the carcass band side portions CBS.

Next, the turning rollers 23, 24 are radially inwardly displaced back in place, and, as shown in FIG. 8(a), a stitching roller 38 which is fabricated with knurling on the surface is used to press a vicinity of the turned end of the carcass band side portion CBS. Then, as shown in FIG. 8(b), the rigid segments 50 are further expanded. In this connection, the expansion is preferably conducted while the inner pressure of the center bladder 9 is reduced, so that a tensile force of the center bladder 9 can be decreased and the rigid segments 50 can be smoothly expanded.

After that, as shown in FIG. 8(c), two layers of belt members 1B, 2B and a tread member T are assembled in this order on the outer periphery of the carcass band center portion CBC along the outer periphery face of the rigid segments 50. Then, a side wall member SW and a rubber chafer member GC are assembled on the side of the carcass band CB of which the side portion is turned to complete a green tire. Subsequently, the rigid segments 50 are contracted to remove the green tire from the tire building drum 1.

Figure 9:
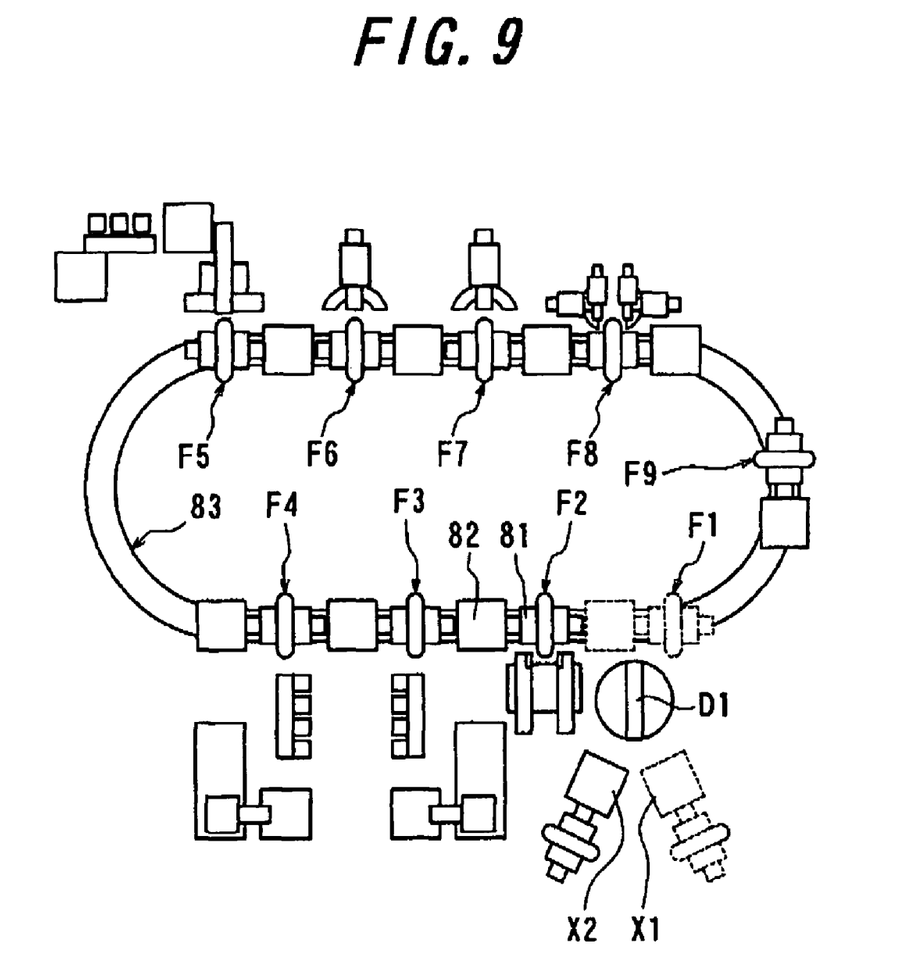
FIG. 9 shows an example of a layout of the tire building system.

FIG. 9 shows an example of a layout of the tire building system using the above-described tire building drum 1. In this tire building system 80, plural tire building drums 1 are mounted on a building cart 82 which is so configured as to run over an endless round path 83. F1 through F9 are work stations at which various kinds of tire components are assembled on the carcass band CB arranged on the tire building drum 1. The tire building drums 1 are mutually synchronized so that they stop at the stations F1-F9 for a given moment and move to the next station and these actions are repeated.

In this embodiment, F1 is a station for arranging the carcass band CB on radially outside of the tire building drum 1 and locking the bead, and F2 is a station for expanding the drum core 10, turning the carcass band side portion and toroidally deforming the carcass band. After passing the station F2, given kinds of tire components are assembled on the toroidal carcass band CB at each of the stations F3-F8 and a green tire is built. The green tire is ejected from the tire building system 80 at the station F9 and transferred to the next step.

In order to vary the size of the tire building drum moving along the round path 83, the tire building drum X1 subjected to the size change is ejected from the station F1 via a rail switching station D1 to outside in the round path 83, and a tire building drum X2 prepared by attaching the number of distance pieces 52 corresponding to the size after the size change on it at a station outside of the round path is introduced as a replacement from the station F1 to the round path 83 via the rail switching station D1. The distance pieces 52 are preliminarily inserted into or removed from the tire building drum X1 ejected from the round path 83 according to a given size assignment so that the drum has the size for the next introduction to the round path 83.

For example, as shown in the figure, the number of tire building drums 1 mounted on the tire building system 80 is set to eight. As the size assignment for the tire building system, tires having the same rim size are manufactured, and there are, for example, seven seizes of tires which have different inner widths of the green tire. That is, these seven sizes are determined by setting the number of distance pieces having the unit thickness to seven even numbers from 0 to 12.

In a situation where there are four sizes possibly built by using five tire building drums 1 at the same time, two sizes possibly built by using four tire building drums 1, and one size possibly built by using three tire building drums 1 among these seven sized, the conventional tire building system needs drum cores corresponding to the 5×4+4×2+3=31 sets of tire building drums while the tire building system 80 according to the present invention needs only (8+3)=11 sets provided that three sets of drum cores have to be carried as reserves for size change or the like. This can greatly reduce the cost and can compress spare inventories.

The tire building system in which the tire building drum moves between the stations at a given tact is shown by way of example, but the present invention is not limited to such a tire building system. Instead, the tire building system may be configured, for example, to have plural stations and conduct the tire building process from the beginning to the end at each station with the tire building drums being fixed, which configuration can achieve the same result.

INDUSTRIAL APPLICABILITY

The tire building drum according to the present invention is used for the system of manufacturing tires of plural sizes having different inner widths of the green tires.

The invention claimed is:
1. A tire building drum, comprising:
bead lock means for holding a pair of bead cores and
a circular drum core expansively supporting a center portion of a carcass band to define an internal shape of a green tire with an outer contour, the drum core comprising:
  several rigid segments which are radially expandable/contractible and which are circumferentially adjacent to each other to form said outer contour,
  wherein, as viewed in a cross sectional plane including a central axis of the drum core, said outer contour has a flat contour portion parallel to the central axis in a widthwise central region and each of the rigid segments has several distance pieces forming at least a part of said flat contour portion and end pieces forming portions of the outer contour widthwise outside of the portion formed by the distance pieces, the distance pieces and the end pieces are aligned in the width direction of the drum core, and
  wherein said distance pieces are disposed such that their thickness direction is directed to the width direction of drum core and are detachably configured, and said end pieces are thicker than said distance pieces in the width direction of the drum core,
wherein said rigid segments comprise:
  a base column supporting the end and distance pieces,
  a center stopper fixed at the center of the base column in the width direction of the drum core as a base point in the width direction of the drum core, and
  an end piece fixing means fixing each of the end pieces on the base column,
wherein, the base column is coupled to a means for radially expanding/contracting the rigid segments,
the base column is provided with a guide support portion supporting the end and distance pieces in such a manner that the end and distance pieces can be moved back and forth in the width direction of the drum core, and
an engagement portion engaging with the guide support portion of the base column is provided on each of the end and distance pieces, wherein, as viewed in the section perpendicular to the width direction of the drum core, the guide support portion of the base column comprises:
a columnar member, wherein the engagement portion of the distance piece comprises a member engaging with the columnar member in male/female manner in the section perpendicular to the width direction, and
a cutout portion that releases the engagement between the base column and the distance piece so as to allow removal of the distance piece without disengagement of the end pieces, the cutout portion provided on the columnar member at the midpoint in its longitudinal direction.

2. The tire building drum according to claim 1, wherein said end pieces, forming a portion of the outer contour of the rigid segment, are configured by arranging comb plates, which mesh with each other between the adjacent segments, in the width direction.

3. The tire building drum according to claim 1, wherein the drum is used for building a radial tire.

4. The tire building drum according to claim 1, wherein an RFID tag is installed as a means for identifying a size of a current condition.

5. A method of manufacturing a tire built with the tire building drum according to claim 1, wherein a green tire is built by locking each of the bead cores with the corresponding bead lock means; thereafter radially expanding the drum core while approaching the bead lock means with each other to inflate the center portion of the carcass band; turning the side portions of the carcass band around the bead cores toward the outside in the radial direction; radially expanding the drum core with keeping the bead cores locked until it reaches the maximum diameter; and assembling tire components including a tread rubber on the expanded drum core.

6. A method of manufacturing a tire built with the tire building drum according to claim 1, wherein the size of the drum core is varied by changing the total thickness of the distance pieces upon changing the size between green tires having different inner widths.

7. The method of manufacturing a tire according to claim 6, wherein, after the size of the drum core is varied and before the drum core is used, a size-identification code in an RFID tag is updated to the code corresponding to the size after the size has varied.

8. A tire building system for building a group of tires including tires in different sizes which have mutually different inner widths of green tires, the tire building system comprising a tire building drum that is used for building tires of at least two sizes among said different sizes,
the tire building drum comprising:
bead lock means for holding a pair of bead cores and
a circular drum core expansively supporting a center portion of a carcass band to define an internal shape of a green tire with an outer contour, the drum core comprising:
several rigid segments which are radially expandable/contractible and which are circumferentially adjacent to each other to form said outer contour,
wherein, as viewed in a cross sectional plane including a central axis of the drum core, said outer contour has a flat contour portion parallel to the central axis in a widthwise central region and each of the rigid segments has several distance pieces forming at least a part of said flat contour portion and end pieces forming portions of the outer contour widthwise outside of the portion formed by the distance pieces, the distance pieces and the end pieces are aligned in the width direction of the drum core,
wherein said distance pieces are disposed such that their thickness direction is directed to the width direction of drum core and are detachably configured, and said end pieces are thicker than said distance pieces in the width direction of the drum core, and
wherein said rigid segments comprise:
a base column supporting the end and distance pieces,
a center stopper fixed at the center of the base column in the width direction of the drum core as a base point in the width direction of the drum core, and
an end piece fixing means fixing each of the end pieces on the base column,
wherein, the base column is coupled to a means for radially expanding/contracting the rigid segments,
the base column is provided with a guide support portion supporting the end and distance pieces in such a manner that the end and distance pieces can be moved back and forth in the width direction of the drum core, and
an engagement portion engaging with the guide support portion of the base column is provided on each of the end and distance pieces,
wherein, as viewed in the section perpendicular to the width direction of the drum core, the guide support portion of the base column comprises:
a columnar member, wherein the engagement portion of the distance piece comprises a member engaging with the columnar member in male/female manner in the section perpendicular to the width direction, and
a cutout portion that releases the engagement between the base column and the distance piece so as to allow removal of the distance piece without disengagement of the end pieces, the cutout portion provided on the columnar member at the midpoint in its longitudinal direction.

9. A method for setting up a tire manufacturing process, comprising:
selecting a desired inner width of a green tire to be built with the tire building system according to claim 8 from plural widths; and
changing an amount of the distance pieces provided in the tire building system according to claim 8 so that the inner width of a green tire built with the tire building system according to claim 8 conforms to the desired inner width.

\* \* \* \* \*